(12) United States Patent
Dolne et al.

(10) Patent No.: US 7,274,442 B2
(45) Date of Patent: Sep. 25, 2007

(54) CLOSED-LOOP WAVEFRONT SENSOR USING FIELD PROGRAMMABLE GATE ARRAY

(75) Inventors: Jean J. Dolne, Thousand Oaks, CA (US); Harold B. Schall, Oak Park, CA (US); Paul J. Menicucci, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 207 days.

(21) Appl. No.: 11/130,061

(22) Filed: May 16, 2005

(65) Prior Publication Data

US 2006/0256321 A1 Nov. 16, 2006

(51) Int. Cl.
  *G01J 1/00* (2006.01)
  *G01J 1/20* (2006.01)
(52) U.S. Cl. .................... 356/121; 250/201.9
(58) Field of Classification Search .......... 356/121; 250/201.9, 216; 359/292
  See application file for complete search history.

(56) References Cited

U.S. PATENT DOCUMENTS

| | | | |
|---|---|---|---|
| 3,980,879 A | 9/1976 | O'Meara |
| 4,141,652 A | 2/1979 | Feinleib |
| 4,309,602 A | 1/1982 | Gonsalves et al. |
| 4,617,479 A | 10/1986 | Hartmann et al. |
| 4,696,573 A | 9/1987 | Hutchin |
| 4,824,243 A | 4/1989 | Wheeler et al. |
| 5,120,128 A | 6/1992 | Ulich et al. |
| 5,128,530 A | 7/1992 | Ellerbroek et al. |
| 5,157,459 A | 10/1992 | Oono et al. |
| 5,229,592 A | 7/1993 | Horwitz et al. |
| 5,229,889 A | 7/1993 | Kittell |
| 5,287,165 A | 2/1994 | Ulich et al. |
| 5,300,766 A | 4/1994 | Granger et al. |
| 5,384,455 A | 1/1995 | Paxman |

(Continued)

FOREIGN PATENT DOCUMENTS

EP  1368692 A2  4/2003

OTHER PUBLICATIONS

Dolne et al., "Practical Issues in Wave-front Sensing by Use of Phase Diversity," Applied Optics, 42(26):5284-5289 (2003).

(Continued)

*Primary Examiner*—Gregory J. Toatley, Jr.
*Assistant Examiner*—Bryan J Giglio
(74) *Attorney, Agent, or Firm*—Timothy K. Klintworth; Wildman, Harrold, Allen & Dixon LLP

(57) ABSTRACT

A system capable of determining wavefront characteristics, such as air induced wavefront aberrations, includes a field programmable gate array (FPGA) device executing a phase diversity algorithm. The FPGA device can be a stand-alone device or comprise multiple FPGAs. The device receives an "in-focus" and an "out-of-focus" image having a known optical difference from that of the "in-focus" image. The device then performs as many phase diversity algorithm iterations as desired to reach an expression for the wavefront aberrations induced on the collected image data. The resulting wavefront data may be used to produce an enhanced image of the original image data. Example applications include remote sensors and targeting systems, and both passive imaging and active projection systems that compensate for wavefront anomalies.

23 Claims, 5 Drawing Sheets

U.S. PATENT DOCUMENTS

| | | | |
|---|---|---|---|
| 5,598,261 | A | 1/1997 | Duncan et al. |
| 5,610,707 | A | 3/1997 | Duncan et al. |
| 6,107,617 | A * | 8/2000 | Love et al. ............... 250/201.9 |
| 6,704,889 | B2 | 3/2004 | Veenstra et al. |
| 6,720,796 | B1 | 4/2004 | Reddy et al. |
| 6,724,222 | B2 | 4/2004 | Patel et al. |
| 6,784,692 | B1 | 8/2004 | Kaviani |
| 6,787,747 | B2 | 9/2004 | Specht et al. |
| 6,795,960 | B1 | 9/2004 | Kong |
| 7,039,252 | B2 * | 5/2006 | Ludwig ....................... 382/280 |
| 2004/0099787 | A1 | 5/2004 | Dolne et al. |

OTHER PUBLICATIONS

Dolne et al., "Information Theoretic Bounds of Phase Diversity for Diversity Polynomials and Noise Statistics," Applied Optics-IP, vol. 42 Issue 26, p. 5284 (2003).

Dolne et al., "Practical Concerns for Phase Diversity Implementation Wavefront Sensing and Image Recovery," Proc. SPIE vol. 4493, pp. 100-111 (2001).

Gerwe et al., "Supersampling Multiframe Blind Deconvolution Resolution Enhancement of Adaptive Optics Compensated Imagery of LEO Satellites," Proc. SPIE vol. 4091, pp. 1087-2085 (2000).

Gerwe et al., "Superresolved Image Reconstruction of Images Taken Through the Turbulent Atmosphere," J. Opt. Soc. Am. A. 15(10), pp. 2620-2628 (1998).

Thelen et al., "Fine-Resolution Imagery of Extended Objects Observed Through Volume Turbulence using Phase-Diverse Speckle," Proc. SPIE 3763, pp. 102-111 (1999).

* cited by examiner

CLOSED-LOOP WAVEFRONT SENSOR USING FIELD PROGRAMMABLE GATE ARRAY

FIELD OF THE DISCLOSURE

The present disclosure relates generally to sensor systems and, more particularly, to optical sensors to correct for wavefront anomalies, such as, atmospheric turbulence or thermal blooming, in a distorting medium.

BACKGROUND OF RELATED ART

Numerous remote target applications, such as high-bandwidth communications and long distance imaging systems, now use over-the-air optical signals for information transfer. Tactical high-energy laser (HEL) systems, for example, communicate optical signals over large distances for object identification and aimpoint controls in laser guided weapons systems. These systems allow operators to identify objects from distances large enough to protect operator safety, but close enough to allow somewhat accurate identification.

Despite showing promise, there are limitations to using optical signals in these applications. One limitation is the effect the atmosphere has on optical signals. In a targeting system, for example, a laser beam may travel long distances through turbulent air before the laser beam reaches its target. This air turbulence can produce a twinkling or blurring effect that degrades the laser beam. The beam distortion and expansion that results from this turbulence alters the wavefront on the laser beam and prevents proper beam focusing, which in turn can mean that the detected image may be indiscernible or unusable.

A few adaptive optics techniques have been proposed to correct for the wavefront anomalies experienced by a laser beam or an optical signal, in general, during propagation. These techniques, however, are only as accurate as the wavefront sensors they employ. Hartmann wavefront sensors, which measure wavefront distortion using point sources as a reference beam against an obtained image, are problematic because they require the generation of a separate reference beam, if a star or point source is not immediately available. This requirement adds to device complexity and can introduce additional sources of scattered light.

In contrast to these point source-based techniques, phase diversity techniques use an extended scene to determine the wavefront anomalies created by the optical aberrations of the imaging system or propagation path. Phase diversity algorithms use at least two images. In the case of the two-image phase diversity configuration, one image contains an additional known aberration with respect to the other image. Phase diversity can be used to correct for blurriness in an image as may result from atmospheric anomalies and thermal blooming. Yet, current phase diversity algorithms require time-consuming microprocessor processing. These microprocessor systems are programming intensive at the front end and, due to the sequential nature of code execution and other factors, too slow at the back end when the algorithm is executed. No matter the processing speed of the microprocessor core, such systems may take seconds or minutes to complete a full phase diversity correction cycle of an object image. This is too slow for many applications, including real time imaging.

SUMMARY OF THE INVENTION

A field programmable gate array (FPGA) system may be programmed such that the FPGA system will determine wavefront data representative of a wavefront aberration. For example, the FPGA system may execute a phase diversity algorithm that converges on the accurate wavefront data through successive algorithm cycles achieved as part of a feedback configuration in the FPGA system.

An embodiment of the invention is a method of determining wavefront aberrations of an optical signal: forming a first image data from a first rendition of the optical image; forming a second image data from a second rendition of the optical image, the second rendition being different than the first rendition; providing the first image data and the second image data to a field programmable gate array (FPGA) system; in the FPGA system, combining the first image data and the second image data using a phase diversity technique; and in the FPGA system, in response to combining of the first image data and the second image data, determining wavefront data representing the wavefront aberrations on the optical signal.

Another embodiment of the invention is an article comprising a field programmable gate array (FPGA) system having programmed logic blocks that, when executed by the FPGA system, cause the FPGA system to: obtain a first image data representing a first rendition of an optical signal and a second image data representing a second rendition of the optical signal different than the first rendition; combine the first image data and the second image data using a phase diversity system; and determine wavefront data representative of a wavefront aberration, wherein the wavefront data is determined at a rate of approximately 30 Hz or faster.

A further embodiment of the invention includes an apparatus comprising: an electronic processor system programmed: to receive a first image data representing a first rendition of an optical signal and a second image data representing a second rendition of the optical signal different than the first rendition; and to execute a phase diversity algorithm comprising a plurality of cycles to determine optimized wavefront data representing a wavefront aberration on the optical signal, wherein the electronic processor system completes the plurality of cycles of the phase diversity algorithm at a rate of 30 Hz or higher.

The apparatuses and techniques may be used in remote communication environments where signal intensities are generally quite low. Further, the optical assemblies may be used in portable, field-deployed applications along with optical receivers and wavefront correction elements.

The features, functions, and advantages can be achieved independently in various embodiments of the present invention or may be combined in yet other embodiments.

BRIEF DESCRIPTION OF THE DRAWINGS

Reference will now be made to the accompanying, example drawings.

DETAILED DESCRIPTION OF AN EXAMPLE

The present invention now will be described more fully hereinafter with reference to the accompanying drawings, in which example implementations are shown. The invention may be embodied in many different forms and should not be construed as limited to the examples set forth herein.

Figure 1:
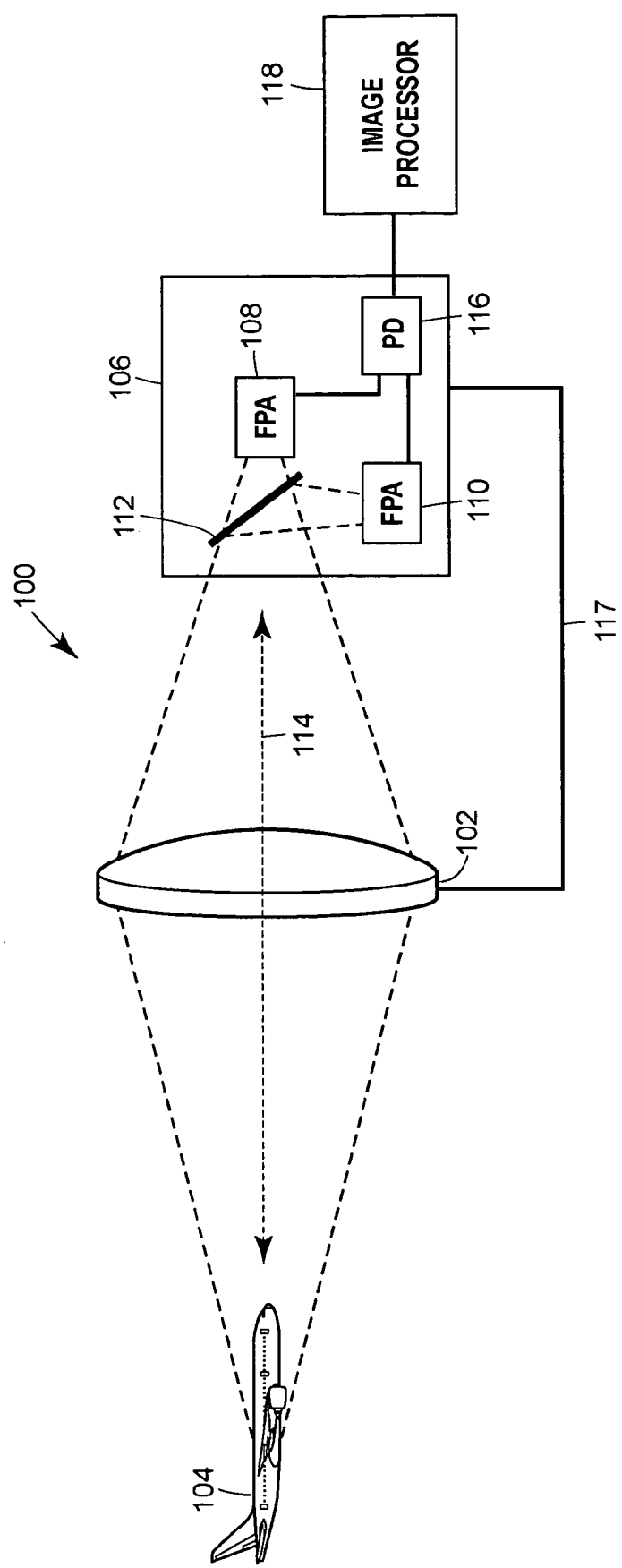
FIG. 1 is a schematic representation of an imaging system having multiple focal plane arrays coupled to a phase diversity system.

FIG. 1 illustrates an example optical system 100 that may be used in a variety of applications, including reconnaissance cameras, HEL tactical systems and other targeting or imaging systems. By way of example, not limitation, the system 100 may be ground-based or space-based.

For example purposes, the system 100 will be described as an optical imaging system capable of capturing an image and determining the wavefront anomalies imparted on that image. In other examples, the system 100 may be an active wavefront compensator that imparts a wavefront anomaly onto a laser signal before transmission, where that wavefront anomaly is conjugate in phase to the wavefront anomaly that will be imparted on the laser signal by the propagation region, so that the two exactly cancel out.

The system 100 includes an optical system 102 capable of capturing and focusing an image of an object 104, which for illustration purposes, and not limitation, is illustrated as an optical objective. More generally, the optical system 102 represents any suitable collection of optical objectives or any image capturing system capable of collecting or projection system capable of projecting light (laser energy or otherwise) over the desired spectrum (visible, near infrared, infrared/thermal energy or otherwise).

In some examples, the optical system 102 may collect entire image data at once. In other examples, the optical system 102 may be a line-scanned system that repeatedly (or periodically in a controlled manner) captures linear images of the object 104, where these linear images may be spaced apart from one another at an image focal plane. The line-scanned optical system may be scanned relative to the object 104 such that the optical system 102 is sequentially pointed at different portions of the object 104, thereby serially capturing images of the different portions. In addition to or instead of scanning of the optical system, the object 104 may move relative to the optical system 102 to affect scanning.

In the illustrated example, the imaging system 100 also includes an image capture assembly 106 with focal plane arrays (FPAs) 108, 110 and a beam splitter 112. By way of example, not limitation, the first focal plane array 108 is positioned relative to the optical-system 102 to receive a first, "in-focus" image of the object 104, while the second focal plane array 110 is positioned to receive a second, "out-of-focus" image of the object 104 that image being reflected by the beam splitter 112. The optical system 102 is illustrated as generally perpendicular to an optical axis 114, although this need not be the case. Further still, although the image capture assembly 106 is described as having a pair of FPAs 108 and 110, the assembly 106 may include additional FPAs, each optically displaced from one another by an optical path difference. Alternatively still, a single focal plane array capable of capturing different images having known or otherwise resolvable optical differences may be used.

As noted above, in the illustrated example, the image received by the first focal plane array 108 is termed an "in focus" image, and the image received by the second focal plane array 110 an "out-of-focus" image. These are relative terms. Although the first image is termed an "in-focus" in this example, in actuality that image may include atmospheric effects or other aberrations that make the "in-focus" image captured by the FPA 108 a degraded rendition of the object 104. Furthermore, the "in-focus" image need not be the optimum focused image at the system 106, but instead, the "in-focus" image may be considered in focus as compared to the "out-of-focus" image, for example, in accord with known phase diversity techniques.

In the illustrated example, while the first FPA 108 is aligned perpendicular to the axis 114, the second FPA 110 is optically displaced from the FPA 108 by a desired optical path distance. If for example this path distance is predetermined, then the "out-of-focus" image received at the second FPA 110 will be out of focus by a known amount, related to that predetermined optical path distance. Alternatively, in some examples, the FPA 110 may be positioned at an unknown optical path distance from the positioning of the FPA 108.

The assembly 106 may have any desired optical displacement or difference between the FPAs 108, 110. By way of example, not limitation, a predetermined displacement distance of one half of one wavelength to one wavelength may be used. Other displacements may be used. See, for example, J. J. Dolne, R. J. Tansey, K. A. Black, J. H. Deville, P. R. Cunningham, K. C. Widen, J. L. Hill, and P. S. Idell, "Practical Concerns for Phase Diversity Implementation in Wavefront Sensing and Image Recovery", Proc. SPIE Vol. 4493, pp. 100-111 (February 2001), incorporated herein by reference. In some examples, the FPAs 108 and 110 are positioned such that the difference in the aberrations affecting the images at each are either substantially identical or can be characterized. The desired optical path length distance between FPA 108 and FPA 110 may be determined by minimizing the residual wavefront error using the phase diversity algorithm.

Each FPA 108 and 110 may have a two-dimensional pixel array, and each may be mounted to a common support (not shown). In line-scanned and other optical systems, each FPA 108 and 110 may include a linear array of pixels positioned proximate to one another, e.g., alongside one another such that the linear arrays of pixels extend in parallel and in an aligned fashion. By way of further examples, not limitation, each FPA 108 and 110 may include a plurality of photosensitive devices mounted, e.g., by epoxy, to a back plane surface that serves as a support. Typical photosensitive devices include, but are not limited to, charge-coupled devices (CCDs), CMOS image sensors, photomultipliers, avalanche photodiodes, bolometers and photographic film. The back plane may be formed of a circuit board with the photosensitive devices mounted upon a major surface of the circuit board. In another configuration, the FPA set may be constructed by mounting photosensitive devices on the edge of multiple circuit boards with the resulting set of boards assembled stackwise. The circuit board(s) of either embodiment could also include a plurality of electrical traces connected to respective photosensitive devices to appropriately address the photosensitive devices and to permit the photosensitive devices to provide an output upon receipt of an image by the FPA.

In the illustrated example, a phase diversity system 116 is coupled to the FPAs 108 and 110 to receive "in-focus" and "out-of-focus" image data, which the system 116 analyzes in the development of wavefront data representing the anomalies introduced on the image of object 104 by the atmosphere and optical system 102. The system 116 for example may execute a phase diversity algorithm to determine the optical aberrations introduced by the propagation region and the imaging system 102 on the image of the object received at the FPAs 108, 110. Phase diversity techniques may determine various aspects of the blur of the image, such as the coma, spherical defocus, astigmatism or the like. In some examples, the optical system 102 may be used to correct and/or compensate for these optical aberrations, for example, via adaptive optical elements such as holograms. For example, if the optical system 102 is an adaptive system, feedback control path 117 may be used to send a wavefront adjustment signal from the assembly 106, e.g., from the phase diversity algorithm system 116 therein, to the system 102 for optical compensation of the wavefront anomalies. In the illustrated example, image correction which alternatively may be performed in the system 116 itself, is performed in a dedicated image processing system 118 capable of producing an enhanced rendition of the object image in response to wavefront data from the system 116.

Phase diversity techniques are now described by way example, not of limitation. According to one phase diversity technique, the images received by the FPAs 108, 110, respectively, are divided into isoplanatic blocks, i.e., regions of an image for which the point spread function does not vary significantly such that the blur of the image is also constant across the region. Phase diversity techniques would be applied to each pair of isoplanatic blocks. In this regard, each pair of blocks includes one block of the image received by the first focal plane array and one block of the image received by the second focal plane array, with the pair of blocks being aligned or otherwise corresponding positionally to one another. The results of the phase diversity analysis for each pair of blocks, such as the various parameters of the blur of the image across the pair of blocks, may be interpolated across the entire image using the results of processing data collected in pairs of focal plane array blocks located at different cross-track locations of the focal plane, with the results utilized to detect wavefront aberrations. The optical system may then be modified to correct and/or compensate for the optical aberrations, or, alternatively, the resultant wavefront characterization can be used as an input to post-processing image reconstruction techniques known to those skilled in the art.

Furthermore, in some examples, the respective images captured at the FPAs 108 and 110 may not-coincide with one another, e.g., one of the FPAs may capture an entire image of the object 104, while the other FPA may capture only a portion of the object's image data with blank or non-associated portions. This may occur, for example, where the object is moving. In such cases and where otherwise useful, interpolation may be used to characterize aberration effects over the full imaging field of either focal plane.

As an alternative to interpolation, a generalized phase diversity might be used which determines values of model parameters which produce a wavefront characterization which agrees with data collected from all segments of the FPAs 108, 110. Such a model would relate the degrees of freedom in the system to the structure of the wavefront and its variations across the field-of-view and to their influence on the first and secondary focal plane arrays. As an example, B. J. Thelen et al., "Fine-Resolution Imagery of Extended Objects Observed through Volume Turbulence using Phase-Diverse Speckle", Proc. SPIE 3763, pp. 102-111 (1999), describes a method for treating anisoplanatic variations of the wavefront aberrations which result from the volume of atmospheric turbulence between the imaging system and the object using a sequence of phase screens. According to this technique, the anisoplanatic variations of the point spread function are determined. Based upon these anisoplanatic variations of the point spread function, the optical system 102 may be adjusted to correct and/or compensate for the anisoplanatic blurring effects by either physical adjustments to the system or by image restoration methods known to those skilled in the art.

EXAMPLE PHASE DIVERSITY FORMULATION

By way of example, not limitation an example phase diversity computation technique will not be described. The diversity image equation $i_d(x,y)$ at the image plane of an isoplanatic imaging system is given by:

$$i_d(x,y) = f_d o h_d(x,y) + n_d(x,y) \quad (1)$$

where $o(x,y)$ is the pristine object absent wavefront aberrations, $h_d(x,y)$, the intensity point spread function (psf), , the convolution operator, $n_d(x,y)$, the independent and identically distributed (iid) noise process, and $f_d$, the fraction of the average of total photocounts going to diversity sensor d with $$\sum_d f_d = 1,$$

assuming no losses. In the case of two diversity images, the first diversity image $i_1(x, y)$ (in the example of FIG. 1, the "in-focus" image) and the first psf $h_1(x, y)$ are denoted by $i(x, y)$ and $h(x, y)$, respectively. The second diversity image $i_2(x, y)$ (in the example of FIG. 1, the "out-of-focus" image) and the second psf $h_2(x, y)$ are denoted by $i_d(x, y)$ and $h_d(x, y)$, and are referred to as diversity (or "out-of-focus") image and psf, respectively.

The psf $h(x, y)$ and the optical transfer function (OTF) $H(u,v)$ are related by a Fourier transform relation as:

$$h(x,y) = \mathfrak{I}^{-1}(H(u,v)), \quad (2)$$

where $\mathfrak{I}$ represents the Fourier transform operator. A similar relation holds for the diversity psf and OTF. The OTF terms $H(u,v)$ and $H_d(u,v)$ are expressed as autocorrelation of the generalized pupil function as follows:

$$H(u,v) = P(u,v)e^{i2\pi\Theta(u,v)} \oplus P(u,v)e^{i2\pi\Theta(u,v)}$$

$$H_d(u,v) = P(u,v)e^{i2\pi(\Theta(u,v)+\Phi(u,v))} \oplus P(u,v)e^{i2\pi(\Theta(u,v)+\Phi(u,v))}, \quad (3)$$

where $\oplus$ is the correlation operator, $P(u,v)$ is a binary function with values of 1 inside the pupil and 0 outside, and to reduce the optimization parameter space, the OPD (Optical Path Difference) map $$\Theta(u, v) = \sum_n c_n Z_n(u, v)$$

is expressed as a weighted sum of basis polynomials $Z_n(u,v)$. The basis polynomials may be, although they need not be, Zernike polynomials, which offer orthogonality over the interior of a unit circle and have rotational symmetry over the optical system. Zernike polynomials include defocus, astigmatisms, comas, elliptical comas, spherical, secondary astigmatisms, quadratic $7^{th}$ orders, coma $5^{th}$ orders, a triangular order, piston and tilt. With $Z_n$ representing Zernike polynomials, $c_n$ represents the Zernike coefficients for these polynomials. In a preferred example, the diversity (or "out-of-focus") image is formed of using a defocus, as the differentiator between the "in-focus" and "out-of-focus" images. Any of the Zernike polynomial factors may be used as the differentiator between the "in-focus" and "out-of-focus" image, instead.

The intensity psfs are expressed as a function of the amplitude psfs a(x,y) and $a_d$(x,y) by:

$$h(x,y) = |a(x,y)|^2 \text{ and } h_d(x,y) = |a_d(x,y)|^2. \quad (4)$$

The diversity (or "out-of-focus") amplitude psf, i.e., the aberration vector for the phase diversity algorithm, is the inverse Fourier transform of the generalized pupil function and is expressed as:

$$a_d(x,y) = \mathfrak{F}^{-1}[P(u,v)\exp\{i2\pi[\Theta(u,v) + \Phi_d(u,v)]\}]. \quad (5)$$

To obtain the "in-focus" amplitude psf, the $\Phi_d(u,v)$ in equation (5) may be set to zero. The expressions for the Fourier transform of the "in-focus" and diversity (or "out-of-focus") images are $I(u,v) = f_1 O(u,v) H(u,v) + N(u,v)$, and $I_d(u,v) = f_d O(u,v) H_d(u,v) + N_d(u,v)$, respectively.

With uncorrelated Gaussian statistics assumed (Gaussian noise is a reasonable assumption when detector thermal noise dominates or when the number of detected signal photons per pixel is more than ~20), the log likelihood of obtaining the object and point spread function given D numbers of diversity (or "out-of-focus") images being collected by a system, each of which is of size X×Y, is given by:

$$L = -\frac{1}{2\sigma^2} \sum_{d,x,y}^{D,X,Y} (i_d(x,y) - f_d o \otimes h_d(x,y))^2 w(x,y), \quad (6)$$

where $\sigma^2$ is the pixel variance and w(x,y) is a window function that accounts for dead pixels or pixels at the edges of the images where ringing can be significant. This represents a log likelihood function indicative of the likely accuracy of the phase diversity algorithm after a complete cycle of D iterations. The objective function equal to the negative of this log-likelihood function, and that may be used to find the optimum parameters, is expressed as:

$$E = -\frac{1}{2\sigma^2} \sum_{d,x,y} (i_d(x,y) - f_d o \otimes h_d(x,y))^2 w(x,y) \quad (7)$$

Despite this description of a general phase diversity algorithm, the present examples are not limited thereto.

Figure 2:
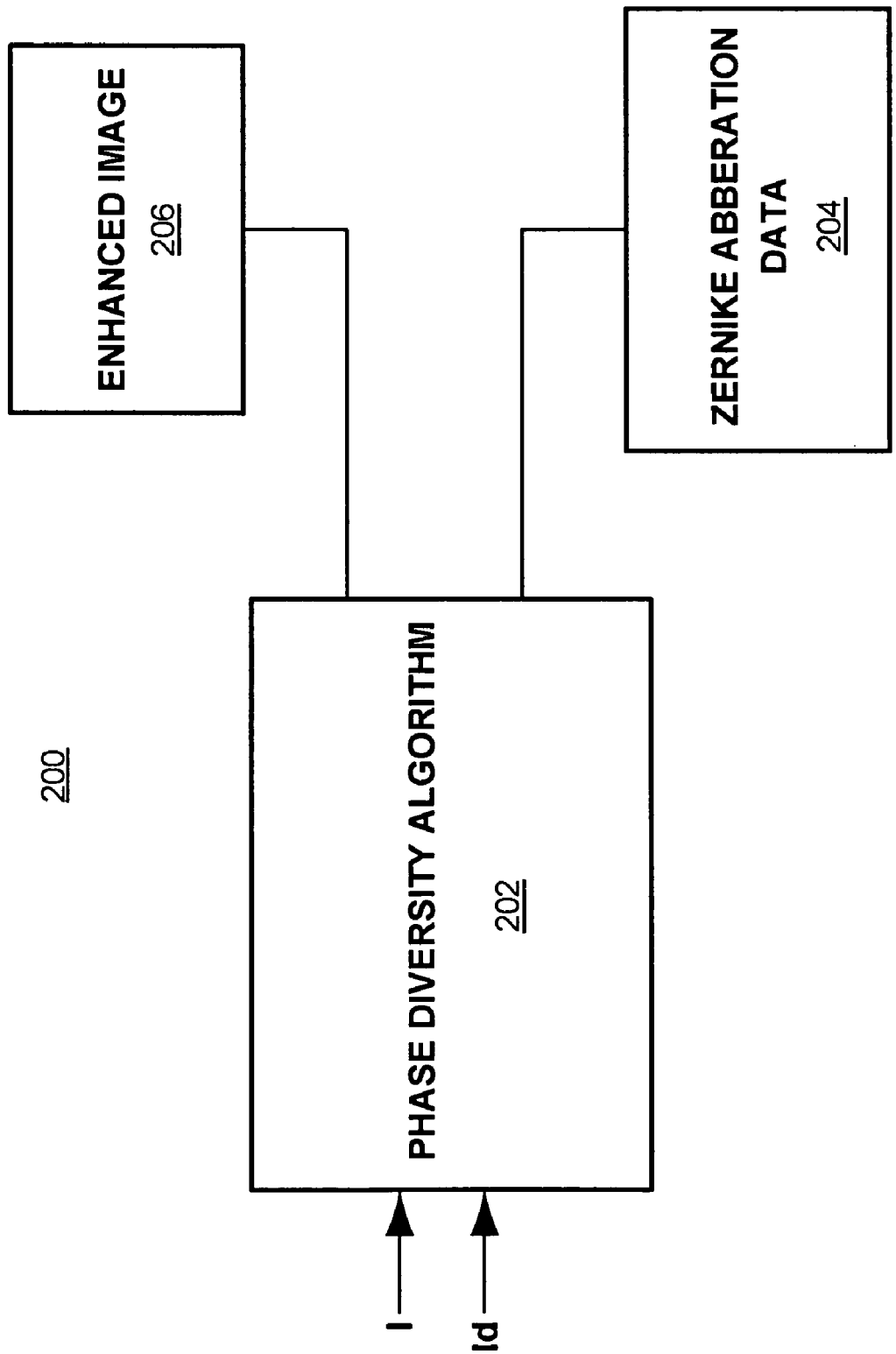
FIG. 2 illustrates a block diagram of an example phase diversity system that may be implemented in the imaging system of FIG. 1.

In an example implementation of a phase diversity technique, FIG. 2 illustrates an example block diagram of a phase diversity system 200. The system 200 includes a phase diversity algorithm block 202 coupled to the FPA 108 and FPA 110 to receive in the "in-focus" image, i(x,y), and the "out-of-focus" image, id(x,y), respectively. In the illustrated example, the block 202 then executes an iterative phase diversity algorithm to converge on wavefront data that expresses the wavefront aberrations, anomalies, etc. introduced by the air medium and/or optics 102. In the example of a Zernike-based system, for example, the block 202 may produce Zernike aberration data 204 and an enhanced image 206. Although the block 202 may produce an enhanced, image 206 of the object 104 in some examples, in other examples, the data from the block 202 may be provided to a separate processor for image enhancement. Separately, the block 202 may produce a likelihood function or other metric indicative of the likely accuracy of phase diversity data, where such likelihood function may be cataloged or otherwise used in tracking performance of the system 200.

Furthermore, the block 202 may receive real time image data based on the renditions captured at the FPAs 108 and 110. Alternatively, however, the block 202 may receive stored image data, such as previously derived image data.

The illustrated example is provided by way of example, not limitation. For a particular implementation, additional features may be added, as desired. For example, the block 202 may receive previously derived phase diversity data, such as Zernike coefficients and polynomials derived from previously collected images. Such information may be used to accelerate the iterative phase diversity calculations, depending on the similarity between the stored and current image data.

The phase diversity system of FIG. 2 may be implemented in a programmable logic device, such as a field programmable gate array (FPGA), which may offer the advantage of being programmed in real time and performing operations in parallel to quicken phase diversity algorithm cycle times, over those achievable with conventional microprocessor systems. Due to the enhanced cycle times, the FPGA may be used as part of a real-time imaging system.

Figure 3:
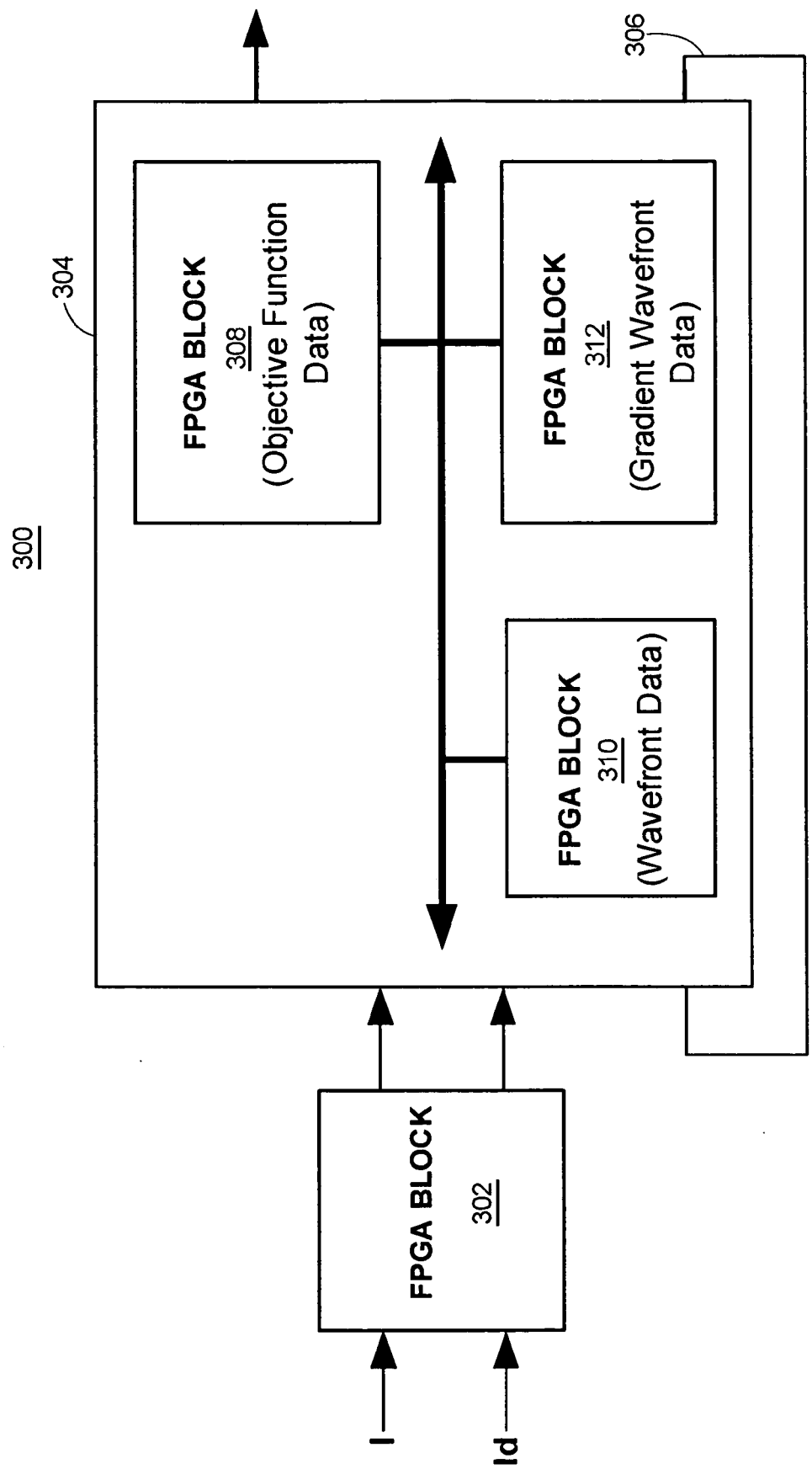
FIG. 3 illustrates a block diagram of phase diversity system implemented in a field programmable gate array system.

An example wavefront aberration detection system 300 implemented in an FPGA environment is shown in FIG. 3. A first FPGA device 302 receives an "in-focus" and "out-of-focus" image and is programmed to take a two-dimensional Fourier transform of that image data and communicate the Fourier transform data to a second FPGA device 304. The FPGA device 304 may be programmed to derive initial wavefront data representing a wavefront error on the two received images. In the illustrated example, the FPGA device 304 would produce such wavefront data upon each iteration of a phase diversity algorithm, where the algorithm optimizes the wavefront data through numerous iterations. The FPGA 304 is shown having a feedback loop 306 as part of this iterative process.

The FPGA device 304 includes a plurality of FPGA devices 308, 310, and 312, in the illustrated example. FPGA device 308, for example, receives Fourier transformed image data from the FPGA device 302 for executing programming to determine an objective function, such as that of equation (7) above. The FPGA device 310 produces wavefront data representing the wavefront error. The device 310 may be coupled to device 308 so that the wavefront data may be used in determining the objective function. Wavefront data from device 310 is also coupled to FPGA 312, which is programmed to determine gradient wavefront data, indicating the change in, the objective function due to wavefront data from device 310 in comparison to previous wavefront data. This gradient data may be compared to a threshold data to determine the accuracy of the wavefront data from device 310. If the wavefront data is accurate, the FPGA device 304 may output the polynomial data and aberration data, such as data tables for $Z_n$ and $c_n$ in the example of a Zernike-based system as described above.

In the illustrated example, the gradient wavefront data and the objective function data may be determined in parallel, e.g., from processes that operate simultaneously or at least partially simultaneously. As described further below by way of example not limitation, each of the blocks 312 and 308 may include transformation blocks, e.g., Fourier transform programmed FPGAs, that are coupled to the block 310 in parallel, such that at least partial simultaneous operation among the transformation blocks may occur.

As discussed by way of example below, the FPGA devices of FIG. 3 may include multiple dedicated FPGAs. Further, these devices may be designed to execute certain programming in parallel, for example affecting "in-focus" and "out-of-focus" image data simultaneously.

Figure 4:
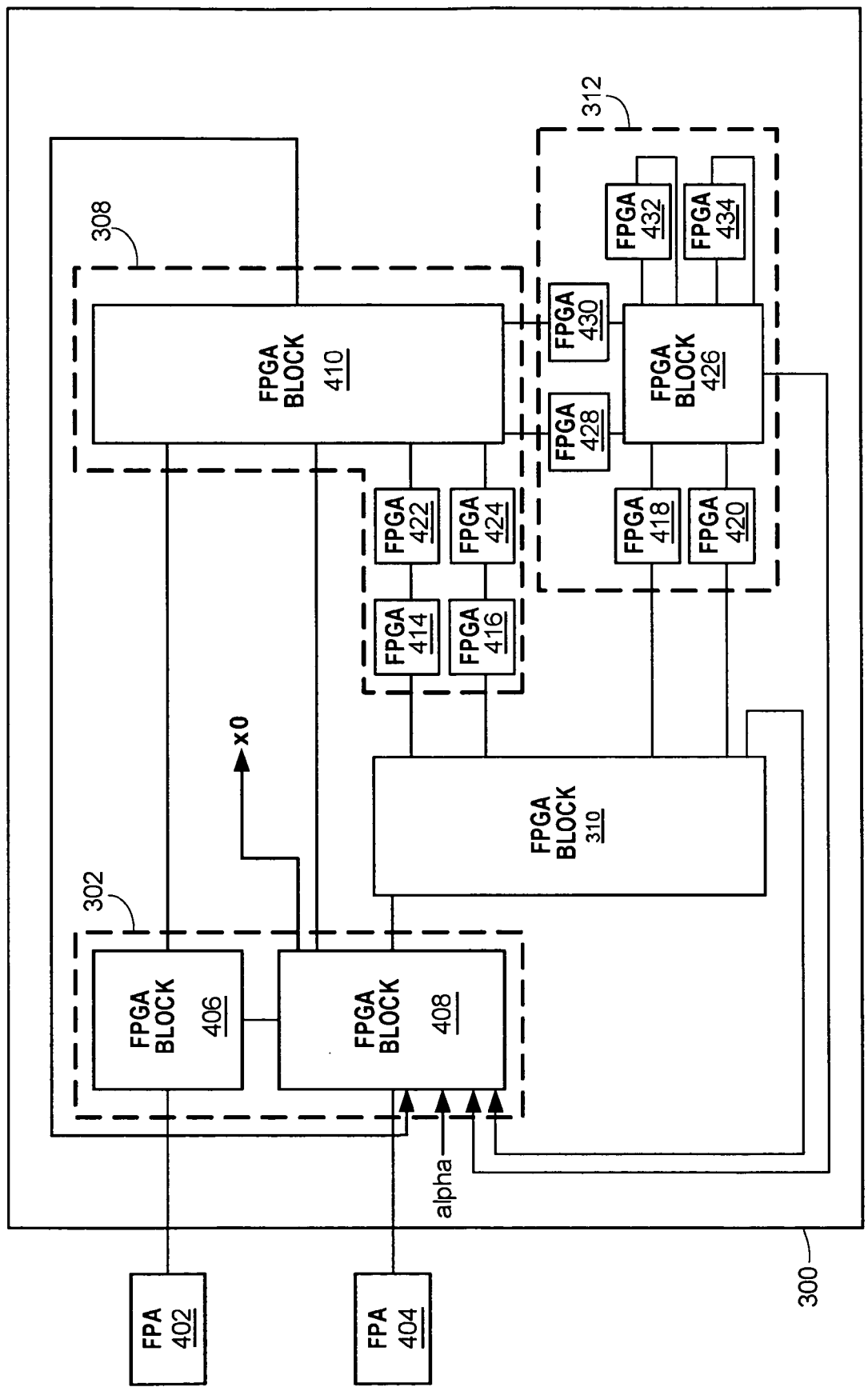
FIG. 4 illustrates a detailed implementation of the field programmable gate array system of FIG. 3.

FIG. 4 illustrates an example implementation of the wavefront aberration system 300. Separate FPAs 402 and 404 provide the "in-focus" and "out-of-focus," or diversity, images, respectively to the system 300. The FPA 402 is coupled to a first FPGA 406, which may be programmed to perform a fast Fourier transform (FFT) on the "in-focus" image, creating a Fourier-transformed image, I, and a conjugate thereof, I*. Preferably, the block 406 performs a two-dimensional Fourier transform (FFT2) over all or a desired portion of image data from the FPA 402.

The FPA 404 is coupled to a second FPGA block 408 that may also perform an FFT2 and conjugation to produce transformed diversity images, Id and Id*, respectively. In the illustrated example, FPGAs 406 and 408 form the FPGA device 302. By way of further example, and also not by limitation, the FPGA 406 is coupled to FPGA 308 and provides a normalization value so that the transformed image data from the FPGAs 306 and 308 is normalized. Further still, the "in-focus" and "out-of-focus" images of the FPAs 402 and 404, respectively, may be synchronized so that the two arrays, and correspondingly the two FPGAs coupled thereto, 406, 408, respectively, operate in a synchronized manner. Such synchronization, which is preferred though not mandatory, may be achieved via coupling the blocks 406 and 408 or blocks 402 and 404 together, as shown. To provide an initialization data signal to the system 300, the FPGA 408 receives an initial a value that may be used by the system 300 to assess the state of the objective function or the gradient of the phase diversity algorithm.

In the illustrated example, the FPGAs 406 and 408 operate in parallel and are coupled to provide their respective outputs (I, I*) and (Id, Id*) to an FPGA device 410, which may produce a value for the objective function of the optical system.

Although various phase diversity algorithms may be implemented, the system 300 illustrates an example algorithm for determining Zernike polynomials. FPGA 408 is coupled to the FPGA device 310 which derives an aperture function for the "in-focus" and the "out-of-focus" optical systems, for example in parallel, where the FPGA device 310 derives these aperture functions upon each iteration of the phase diversity algorithm. The aperture functions, one for the "in-focus" image the other for the "out-of-focus" image, are coupled to FPGAs 414 and 416, respectively, and separately to FPGAs 418 and 420, respectively, where each of the FPGAs 414-420 performs a FFT2.

FPGA 414 is coupled to an FPGA 422 which performs an inverse FFT2 (IFFT2) of the magnitude squared of the result from FPGA 414 to derive an expression for the optical transfer function (H) for the "in-focus" image, which data is provided to FPGA 410. FPGA 416 is coupled to FPGA 424 which performs an IFFT2 of the magnitude squared of the result from FPGA 416 to derive an expression for the optical transfer function (Hd) for the "out-of-focus" image, which data is provided to FPGA 410, as well. In the illustrated example, the FPGAs 410, 414, 416, 422 and 424 form the FPGA device 308 of FIG. 3. The FPGA 410 uses the optical transfer data along with the image data to derive the objection function, which is provided in a feedback signal to the FPGA 408 for use by the phase diversity algorithm in converging on the wavefront data.

To derive the gradient function as part of each phase diversity algorithm iteration, the FPGAs 418 and 420 are coupled to an FPGA 426 which derives a gradient wavefront data that represents the ratio of the change in the objective function as the aberration is changed. After numerous iterations and after the gradient data drops below a threshold, the system 300 may then determine that the optimum phase diversity aperture function data and therefore the optimum aberration data have been achieved, and the phase diversity algorithm may be converged. A threshold value for the optimum gradient range may be programmed into the FPGA 426. Generally, it is desirable to have the gradient as small as practicable.

The FPGA 426 is coupled to the FPGA 410 via FPGAs 428 and 430, which in the illustrated example perform an FFT2 on terms composed of combination of I, Id, H, and Hd. The FPGA 426 is also coupled to two IFFT2 FPGAs 432 and 434 that essentially perform the convolution of the aperture function with functions resulting from FPGA 410. In the example of a Zernike-based system, the FPGA 426 produces a gradient wavefront data for the Zernike aberration coefficients and that information is coupled to the FPGA 408 in a feedback configuration. The FPGA 408 uses this gradient information along with the preliminary Zernike polynomial vector data from FPGA 310, to determine if the α fed to the FPGA 310 should be optimized for a next phase diversity algorithm iteration.

The iteration process may continue for the two collected "in-focus" and "out-of-focus" images until an optimum value for the objective function and/or its gradient is achieved. When the phase diversity algorithm has found the optimum value, e.g., when the gradient data from FPGA 426 is below a threshold, then the FPGA 408 may output the aberration data in table form, shown as x0 in FIG. 4.

The parallel nature of the FPGAs illustrated in FIG. 4, e.g., the output from FPGA blocks 310 and 302, is advantageous to allow faster iteration times through parallel operation. Such parallel operation is provided by way of example, however, not limitation. Further, each of the illustrated FPGAs 414-420 has been programmed to perform an FFT2, however, two or more of the blocks may be combined for dual purpose or serial operation. Further still, in the illustrated example, the system 300 uses numerous FPGAs each programmed to perform an FFT2 or an IFFT2. Yet alternatively, multiple one-dimensional FFTs or the previous blocks performing additional operations may be used. For example, although a dedicated FFT2 may be used, alternatively an FPGA with a one-dimensional FFT capable of performing a Fourier transform first on row data (e.g., all x coordinates) and then on column data (e.g., all y coordinates), or vice versa, may be used. For example, a FPGA may calculate a two-dimensional FFT using a one-dimensional transform on all rows, transposing the results, and then performing a one-dimensional transform on all columns.

Further still, multiple FPGAs may be used to perform a single FFT2 in even faster time by dividing the transform data into segments and then performing an FFT2 on each segment in parallel. For example, the FPA 402 may divide image data into M segments (e.g., dividing a 128×128 pixel array into 4 segments 32×128 segments). The FPGA 406 may then represent M FPGAs one for each segment, such that each of the M FPGAs may perform its FFT2 simultaneously with each other of the M FPGAs.

Example programmable FPGAs for performing an FFT or FFT2 are the Virtex family of FPGA, available from Xilinx Corporation of San Jose, Calif. Example FPGAs include the XC2VP50, XC4VLX80, XC4VSX55, and XC2VP20 and are also available from Xilinx Corporation.

By way of example, not limitation, an FPGA architecture may include an array of configurable logic blocks (CLBs) surrounded by programmable input/output blocks (IOBs). The CLBs and IOBs may be interconnected by a hierarchy of programmable routing resources, where the routing resources may comprise many interconnect wires and associated programmable interconnect points (PIPs). PIPs may contain a pass transistor that can be turned on and off, thereby allowing an associated interconnect wire to be either connected or disconnected (depending on the state of the transistor) to other circuit elements, for example. These CLBS, IOBs, and programmable routing resources may be customized by loading a configuration bitstream into the FPGA, which would be done to program the FPGA to perform an assigned task, such as those described in examples herein. The configuration data may be read from memory (e.g., an external PROM) or written into the FPGA by an external device. The collective states of the individual memory cells then determine the functionality of the FPGA. This description of an example FPGA is by way of example, however, as FPGAs may be implemented with additional or other features. In general, the FPGAs described herein may be programmed using various programming languages, including software tools such as routing software in the VHDL, C, and C++ languages. Furthermore, programming the FPGA may automatically hardwire the FPGA with instructions corresponding to the executable code.

Figure 5:
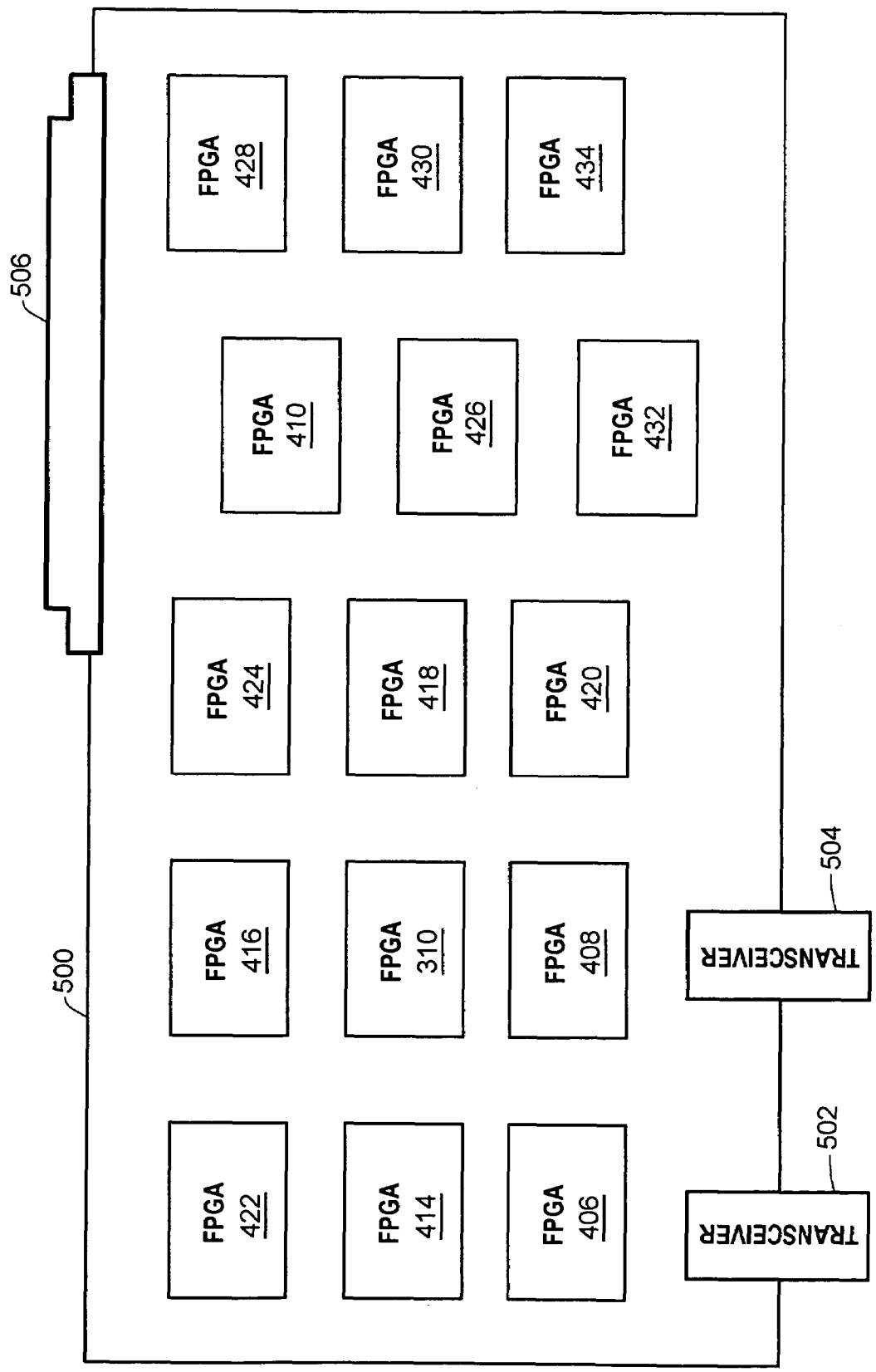
FIG. 5 illustrates a layout board including the field programmable gate array system of FIG. 4.

The system 300 may be implemented on a layout board 500, as illustrated in FIG. 5. All the FPGAs of FIG. 4 are mounted to the layout board 500 as well as fiber optic transceivers 502 and 504 that receive the "in-focus" and "out-of-focus" image data from FPAs (not shown), respectively. The FPGAs may be coupled together via a conductive pattern printed on the board 500 or via a common bus on the board 500. The board 500 may have a connector for mounting to motherboard, rack mount system, or the like for programming or testing the FPGAs of FIG. 4.

Alternative to optical transceivers, the elements 502 and 504 may be replaced with electrical transceivers if the data from the FPA has already been converted to electrical form. In the illustrated example, the calculated phase diversity algorithm's polynomial data, aberration estimate, and likelihood function are provided by the optical transceiver 504, which itself may be coupled to a separate processor system for deriving the enhanced image.

For a monochromatic, 8-bit dynamic range 128×128 pixel FPA image, using a M=4 segment parallelization on the images, the 128×128 FFT2 of FPGAs 406 and 408 may be performed in approximately 35 μs, for example. The FPGA 310 may produce a first objective function, E, in approximately 186 μs, and FPGA 426 may derive gradient wavefront data in approximately 283 μsecs. This would represent the time for one iteration of the phase diversity algorithm. If one assumes an arbitrary 20 iterations (all taking the same amount of time as the first iteration) before the optimum gradient thresholds are achieved, the system would complete a full cycle in 4.3 ms, or with a 200 Hz cycle rate, fast enough to allow for real time imaging. Of course, these data are provided by way of example. It is noted that first iteration of the phase diversity algorithm is longer than the subsequent iterations, in some examples. Therefore, the cycle rate in this example is general in nature. In any event, the FPGA system may be optimized for any desired cycle rate, and because the FPGA system may complete an iteration in such a fast manner, more iterations may be completed in a given time frame. For example, and not be limitation, an FPGA system may achieve a complete phase diversity cycle with an effective bandwidth of 30 Hz or higher, e.g., between 40 to 100 Hz. In the example of FIG. 1, for example, the phase diversity system 116 may complete a full wavefront anomaly analysis over this range. The additional bandwidth for adjusting the adaptive optics, e.g., via feedback control 117, will depend on the bandwidth of the optical system 102. Similarly the full bandwidth including image processing at block 118 or within the system 116, if done there, may be longer depending on the bandwidths associated with these processes.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalence.

What is claimed is:

1. A method of determining wavefront aberrations of an optical signal, for at least one of a targeting, sensor, and imaging system, in order to correct for the wavefront aberrations of the optical signal, the method comprising: forming a first image data from a first rendition of the optical signal; forming a second image data from a second rendition of the optical signal, the second rendition being different than the first rendition; providing the first image data and the second image data to a field programmable gate array (FPGA) system; in the FPGA system, combining the first image data and the second image data using a phase diversity technique; and in the FPGA system, in response to combining of the first image data and the second image data, determining wavefront data representing the wavefront aberrations on the optical signal in order to correct for the wavefront aberrations of the optical signal.

2. The method of claim 1, wherein the second image data is defocused in comparison to the first image data.

3. The method of claim 1, further comprising determining if the phase diversity technique has converged on the wavefront data.

4. The method of claim 3, wherein determining if the phase diversity technique has converged comprises: determining gradient wavefront data; and providing the gradient wavefront data to the FPGA system in a feedback configuration.

5. The method of claim 4, further comprising determining an objective function data from a guessed wavefront data, the first image data, and the second image data.

6. The method of claim 5, further comprising providing the objective function data to the FPGA system in a feedback configuration.

7. The method of claim 1, wherein combining the first image data to the second image in the phase diversity technique comprises performing a first Fourier transform on the first image data and performing a second Fourier transform on the second image data, where the first Fourier transform and the second Fourier transform are performed in parallel.

8. The method of claim 1, further comprising deriving an enhanced rendition of the optical signal from the wavefront data representing the wavefront aberrations.

9. An article comprising a field programmable gate array (FPGA) system having programmed logic blocks that, when executed by the FPGA system, cause the FPGA system to: obtain a first image data representing a first rendition of an optical signal and a second image data representing a second rendition of the optical signal different than the first rendition; combine the first image data and the second image data using a phase diversity system; and determine wavefront data representative of a wavefront aberration, wherein the wavefront data is determined at a rate of approximately 30Hz or faster.

10. The article of claim 9, the FPGA system having programmed logic blocks, that when executed by the FPGA system, cause the FPGA system to: a) determine objective function data; and b) determine gradient wavefront data, where a) and b) are executed in parallel.

11. The-article of claim 10, the FPGA system having programmed logic blocks, that when executed by the FPGA system, cause the FPGA system to: c) provide the gradient wavefront data to the FPGA system in a feedback conflgnration; and d) provide the objective function data to the FPGA system in a feedback configuration.

12. The article of claim 9, wherein the second image data is defocused in comparison to the first image data.

13. The article of claim 9, the FPGA system having programmed logic blocks, that when executed by the FPGA system, cause the FPGA system to execute a plurality of phase diversity algorithm cycles to determine the wavefront data representing the wavefront aberration.

14. An apparatus comprising: an electronic processor system, comprising a field programmable gate array (FPGA) device, programmed: to receive a first image data representing a first rendition of an optical signal and a second image data representing a second rendition of the optical signal different than the first rendition; and to execute a phase diversity algorithm comprising a plurality of cycles to determine optimized wavefront data representing a wavefront aberration on the optical signal, wherein the electronic processor system completes the plurality of cycles of the phase diversity algorithm at a rate of 30 Hz or higher.

15. The apparatus of claim 14, wherein the FPGA device comprises: a first FPGA portion programmed to derive the wavefront data; and a second FPGA portion programmed to derive an objective function.

16. The apparatus of claim 15, wherein the FPGA device further comprises a third FPGA portion that receives the wavefront data from the FPGA device and is programmed to derive gradient wavefront data from the wavefront data, wherein the second FPGA portion and the third FPGA portion are coupled to operate in parallel.

17. The apparatus of claim 14, wherein the electronic processor system receives image data divided into M segments, where M is an integer greater than 1,and wherein a first FPGA portion performs a transformation on each of the M segments simultaneously.

18. The apparatus of claim 14, wherein the second image data is defocused in comparison to the first image data.

19. An apparatus comprising: an electronic processor system programmed: to receive a first image data representing a first rendition of an optical signal and a second image data representing a second rendition of the optical signal different than the first rendition, wherein the electronic processor system receives image data divided into M segments, where M is an integer greater than 1 and wherein a first FPGA portion performs a transformation on each of the M segments simultaneously; and to execute a phase diversity algorithm comprising a plurality of cycles to determine optimized wavefront data representing a wavefront aberration on the optical signal, wherein the electronic processor system completes the plurality of cycles of the phase diversity algorithm at a rate of 30 Hz or higher.

20. The apparatus of claim 19, wherein the electronic processor system is a field programmable gate array (FPGA) device.

21. The apparatus of claim 20, wherein the FPGA device comprises: the first FPGA portion programmed to derive the wavefront data; and a second FPGA portion programmed to derive an objective function.

22. The apparatus of claim 21, wherein the FPGA device further comprises a third FPGA portion that receives the wavefront data from the FPGA device and is programmed to derive gradient wavefront data from the wavefront data, wherein the second FPGA portion and the third FPGA portion are coupled to operate in parallel.

23. The apparatus of claim 19, wherein the second image data is defocused in comparison to the first image data.

* * * * *